US010955981B2

(12) United States Patent
Gong

(10) Patent No.: US 10,955,981 B2
(45) Date of Patent: Mar. 23, 2021

(54) TOUCH CONTROL PANEL HAVING A 3D BODY AND TOUCH SENSING VERTICES PORTIONS, TOUCH CONTROL DISPLAY APPARATUS, AND FABRICATING METHOD THEREOF

(71) Applicants: Chengdu BOE Optoelectronics Technology Co., Ltd., Sichuan (CN); BOE Technology Group Co., Ltd., Beijing (CN)

(72) Inventor: Qing Gong, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/616,960

(22) PCT Filed: Mar. 1, 2018

(86) PCT No.: PCT/CN2018/077746
§ 371 (c)(1),
(2) Date: Nov. 25, 2019

(87) PCT Pub. No.: WO2019/052125
PCT Pub. Date: Mar. 21, 2019

(65) Prior Publication Data
US 2020/0104014 A1    Apr. 2, 2020

(30) Foreign Application Priority Data
Sep. 15, 2017   (CN) .......................... 201710832242.0

(51) Int. Cl.
*G06F 3/044*    (2006.01)

(52) U.S. Cl.
CPC .......... *G06F 3/0446* (2019.05); *G06F 3/0443* (2019.05); *G06F 3/0445* (2019.05);
(Continued)

(58) Field of Classification Search
CPC .... G06F 3/0448; G06F 3/0445; G06F 3/0416; G06F 3/0443; G06F 3/0446; G06F 3/041; G06F 2203/04102; G06F 2203/04103
See application file for complete search history.

(56) References Cited

U.S. PATENT DOCUMENTS

2010/0090981 A1   4/2010  Park et al.
2013/0002583 A1*  1/2013  Jin .......................... G06F 3/041
                                                                    345/173

(Continued)

FOREIGN PATENT DOCUMENTS

CN   101727234 A   6/2010
CN   201576268 U   9/2010

(Continued)

OTHER PUBLICATIONS

Second Office Action in the Chinese Patent Application No. 201710832242.0, dated Jun. 12, 2020; English translation attached.

(Continued)

*Primary Examiner* — Darlene M Ritchie
(74) *Attorney, Agent, or Firm* — Intellectual Valley Law, P.C.

(57) ABSTRACT

The present application discloses a touch control panel having a three-dimensional body having one or more vertices portions. The touch control panel includes a touch electrode layer extending into the one or more vertices portions for detecting a touch. The touch electrode layer includes a plurality of touch electrodes, each of which including a plurality of electrode blocks electrically connected together. The plurality of electrode blocks include a (Continued)

plurality of electrode blocks of an irregular shape in the one or more vertices portions of the three-dimensional body. The plurality of electrode blocks of the irregular shape in the one or more vertices portions and multiple electrode blocks of the plurality of electrode blocks outside the one or more vertices portions have different shapes and sizes.

20 Claims, 7 Drawing Sheets

(52) U.S. Cl.
CPC .. *G06F 3/0448* (2019.05); *G06F 2203/04102* (2013.01); *G06F 2203/04103* (2013.01)

(56) References Cited

U.S. PATENT DOCUMENTS

| | | | |
|---|---|---|---|
| 2015/0009428 A1* | 1/2015 | Nakayama | H01L 27/323 349/12 |
| 2015/0041050 A1 | 2/2015 | Chen et al. | |
| 2017/0068355 A1 | 3/2017 | Nagata et al. | |
| 2017/0185224 A1* | 6/2017 | Nagata | G06F 3/0446 |
| 2017/0246818 A1 | 8/2017 | Chou | |
| 2017/0351365 A1* | 12/2017 | Sasaki | H01L 27/3262 |
| 2018/0054903 A1* | 2/2018 | Yamamoto | H05K 5/0017 |
| 2018/0074609 A1* | 3/2018 | Jeon | G06F 3/0446 |
| 2018/0120988 A1* | 5/2018 | Kim | G06F 3/0418 |
| 2018/0329544 A1* | 11/2018 | Yeh | G06F 3/0418 |
| 2018/0348929 A1* | 12/2018 | Rhe | G06F 3/047 |
| 2019/0042038 A1* | 2/2019 | Lee | G06F 3/047 |
| 2020/0167040 A1* | 5/2020 | Shepelev | G06F 3/0412 |
| 2020/0201462 A1* | 6/2020 | Ko | G06F 3/04164 |
| 2020/0218393 A1* | 7/2020 | Hua | G06F 3/0416 |

FOREIGN PATENT DOCUMENTS

| | | |
|---|---|---|
| CN | 103218080 A | 7/2013 |
| CN | 103902089 A | 7/2014 |
| CN | 104049788 A | 9/2014 |
| CN | 104346017 A | 2/2015 |
| CN | 104656966 A | 5/2015 |
| CN | 104808843 A | 7/2015 |
| CN | 204936386 U | 1/2016 |
| CN | 105630249 A | 6/2016 |
| CN | 205656603 U | 10/2016 |
| CN | 106557206 A | 4/2017 |
| JP | 5916516 B2 | 5/2016 |
| TW | 201349035 A | 12/2013 |
| WO | 2015170677 A1 | 11/2015 |
| WO | WO-2015182473 A1 * 12/2015 ......... G06F 3/04166 |
| WO | WO-2016035542 A1 * 3/2016 ............. B32B 1/08 |

OTHER PUBLICATIONS

International Search Report & Written Opinion dated Jun. 22, 2018, regarding PCT/CN2018/077746.
First Office Action in the Chinese Patent Application No. 201710832242.0, dated Dec. 25, 2019; English translation attached.

* cited by examiner forming a mother touch panel on a substantially flat base substrate

↓ removing a portion of the mother touch panel in one or more corners of the mother touch panel thereby forming the plurality of electrode blocks of the irregular shape and allowing the mother touch panel to be folded into the three-dimensional body

↓ subsequent to removing the portion of the mother touch panel, folding the mother touch panel into the three-dimensional body having the one or more vertices portions

FIG. 4

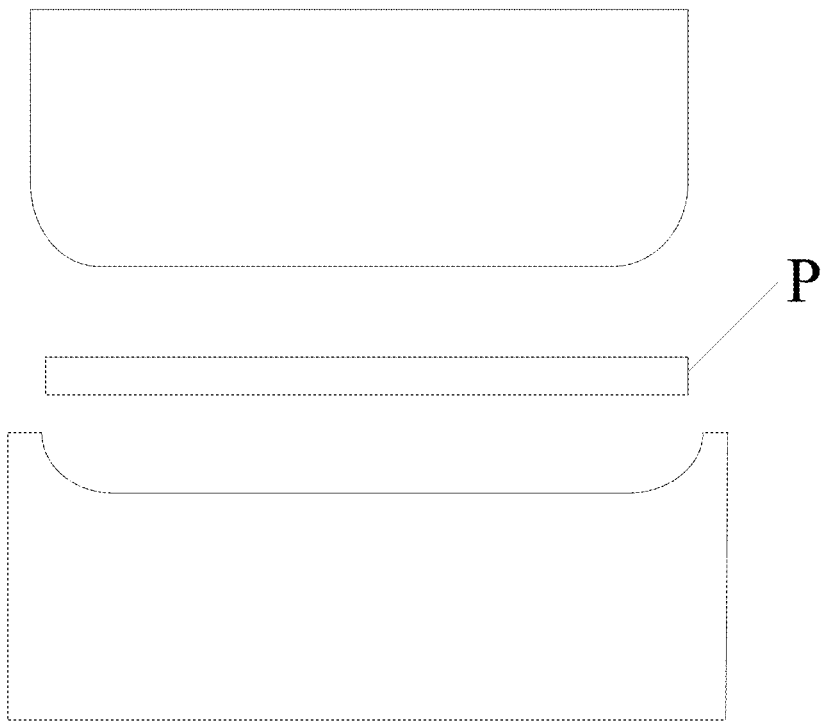

TOUCH CONTROL PANEL HAVING A 3D BODY AND TOUCH SENSING VERTICES PORTIONS, TOUCH CONTROL DISPLAY APPARATUS, AND FABRICATING METHOD THEREOF

CROSS-REFERENCE TO RELATED APPLICATION

This application is a national stage application under 35 U.S.C. § 371 of International Application No. PCT/CN2018/077746, filed Mar. 1, 2018, which claims priority to Chinese Patent Application No. 201710832242.0, filed Sep. 15, 2017, the contents of which are incorporated by reference in the entirety.

TECHNICAL FIELD

The present invention relates to display technology, more particularly, to a touch control panel, a touch control panel apparatus, and a method of fabricating a touch control panel.

BACKGROUND

Various types of touch panels have been developed. Examples of touch panels include one-glass-solution (OGS) touch panels, on-cell touch panels, and in-cell touch panels. The on-cell touch panels provide high touch control accuracy. The on-cell touch panels can be classified into single-layer-on-cell (SLOC) touch panels and multi-layer-on-cell (MLOC) touch panels. In particular, multiple point touch control can be achieved in the MLOC touch panels with superior touch control accuracy and blanking effects.

SUMMARY

In one aspect, the present invention provides a touch control panel having a three-dimensional body having one or more vertices portions, comprising a touch electrode layer extending into the one or more vertices portions for detecting a touch; wherein the touch electrode layer comprises a plurality of touch electrodes, each of which comprising a plurality of electrode blocks electrically connected together; the plurality of electrode blocks comprises a plurality of electrode blocks of an irregular shape in the one or more vertices portions of the three-dimensional body; and the plurality of electrode blocks of the irregular shape in the one or more vertices portions and multiple electrode blocks of the plurality of electrode blocks outside the one or more vertices portions have different shapes and sizes.

Optionally, each of the plurality of electrode blocks of the irregular shape has a shape different from a shape of electrode blocks located within a repeating pattern of the plurality of touch electrodes.

Optionally, at least one of the plurality of electrode blocks of the irregular shape in the three-dimensional body is spaced apart from adjacent electrode blocks of the plurality of electrode blocks by a first distance; and the at least one of the plurality of electrode blocks of an irregular shape is spaced apart from adjacent electrode blocks of the plurality of electrode blocks by a distance greater than the first distance when the touch electrode layer spread on a substantially flat surface.

Optionally, the three-dimensional body has substantially flat portion; and the plurality of electrode blocks of the irregular shape in the one or more vertices portions and multiple electrode blocks of the plurality of electrode blocks in the substantially flat portion have different shapes and sizes.

Optionally, the three-dimensional body has one or more curved edge portions connecting to the one or more vertices portions; and the plurality of electrode blocks of the irregular shape in the one or more vertices portions and multiple electrode blocks of the plurality of electrode blocks in the one or more curved edge portions have different shapes and sizes.

Optionally, the one or more vertices portions are one or more radiused vertices portions.

Optionally, the three-dimensional body is a cuboid body having four radiused vertices portions and four curved edge portions connecting the four radiused vertices portions; and the touch electrode layer is a continuous touch electrode layer extending throughout one or more face portions of the cuboid body, the four radiused vertices portions, and the four curved edge portions.

Optionally, the touch control panel is a mutual capacitive touch control panel, comprising a plurality of touch sensing electrodes and a plurality of touch scanning electrodes; each of the plurality of touch sensing electrodes comprises a plurality of sensing electrode blocks electrically connected together; each of the plurality of touch scanning electrodes comprises a plurality of scanning electrode blocks electrically connected together; the plurality of sensing electrode blocks comprises a plurality of sensing electrode blocks of an irregular shape in the one or more vertices portions of the three-dimensional body; the plurality of sensing electrode blocks of the irregular shape in the one or more vertices portions and multiple sensing electrode blocks of the plurality of sensing electrode blocks outside the one or more vertices portions have different shapes and sizes; the plurality of scanning electrode blocks comprises a plurality of scanning electrode blocks of an irregular shape in the one or more vertices portions of the three-dimensional body; and the plurality of scanning electrode blocks of the irregular shape in the one or more vertices portions and multiple scanning electrode blocks of the plurality of scanning electrode blocks outside the one or more vertices portions have different shapes and sizes.

Optionally, each of the plurality of sensing electrode blocks of the irregular shape has a shape different from a shape of electrode blocks located within a repeating pattern of the plurality of touch sensing electrodes; and each of the plurality of scanning electrode blocks of the irregular shape has a shape different from a shape of electrode blocks located within a repeating pattern of the plurality of touch scanning electrodes.

Optionally, the touch control panel is a flexible touch control panel.

In another aspect, the present invention provides a touch control display apparatus comprising the touch control panel described herein or fabricated by a method described herein.

In another aspect, the present invention provides a method of fabricating a touch control panel having a three-dimensional body having one or more vertices portions, comprising forming a touch electrode layer extending into the one or more vertices portions for detecting a touch; wherein forming the touch electrode layer comprises forming a plurality of touch electrodes, each of which formed to comprise a plurality of electrode blocks electrically connected together; wherein forming the plurality of electrode blocks comprises forming a plurality of electrode blocks of an irregular shape in the one or more vertices portions of the three-dimensional body; and wherein the plurality of electrode blocks of the irregular shape in the one or more vertices portions and multiple electrode blocks of the plurality of electrode blocks outside the one or more vertices portions are formed to have different shapes and sizes.

Optionally, each of the plurality of electrode blocks of the irregular shape is formed to have a shape different from a shape of electrode blocks located within a repeating pattern of the plurality of touch electrodes.

Optionally, the method comprises forming a mother touch panel on a substantially flat base substrate; removing a portion of the mother touch panel in one or more corners of the mother touch panel thereby forming the plurality of electrode blocks of the irregular shape and allowing the mother touch panel to be folded into the three-dimensional body; and subsequent to removing the portion of the mother touch panel, folding the mother touch panel into the three-dimensional body having the one or more vertices portions.

Optionally, folding the mother touch panel into the three-dimensional body is performed by molding.

Optionally, folding the mother touch panel into the three-dimensional body is performed by three-dimensional encapsulation.

Optionally, subsequent to removing the portion of the mother touch panel and prior to folding the mother touch panel, further comprising forming one or more connection bridges connecting one of the plurality of electrode blocks of the irregular shape with an adjacent electrode block so that the plurality of electrode blocks in each individual one of the plurality of touch electrodes are electrically connected.

Optionally, removing the portion of the mother touch panel comprises removing a portion of the mother touch panel in each of four corners of the mother touch panel; the mother touch panel is folded into the three-dimensional body having four vertices portions and four curved edge portions connecting the four vertices portions; and the touch electrode layer is formed as a continuous touch electrode layer extending throughout one or more face portions of the three-dimensional body, the four vertices portions, and the four curved edge portions.

Optionally, the three-dimensional body has one or more curved edge portions connecting to the one or more vertices portions; and the plurality of electrode blocks of the irregular shape in the one or more vertices portions and multiple electrode blocks of the plurality of electrode blocks in the one or more curved edge portions have different shapes and sizes.

Optionally, the three-dimensional body is a cuboid body having four radiused vertices portions and four curved edge portions connecting the four radiused vertices portions; wherein the touch electrode layer is formed as a continuous touch electrode layer extending throughout one or more face portions of the cuboid body, the four radiused vertices portions, and the four curved edge portions.

Optionally, the touch control panel is a mutual capacitive touch control panel; forming the touch electrode layer comprises forming a plurality of touch sensing electrodes and a plurality of touch scanning electrodes; each of the plurality of touch sensing electrodes is formed to comprise a plurality of sending electrode blocks electrically connected together; each of the plurality of touch scanning electrodes is formed to comprise a plurality of scanning electrode blocks electrically connected together; the plurality of sensing electrode blocks are formed to comprise a plurality of sensing electrode blocks of an irregular shape in the one or more vertices portions of the three-dimensional body; the plurality of sensing electrode blocks of the irregular shape in the one or more vertices portions and multiple sensing electrode blocks of the plurality of sensing electrode blocks outside the one or more vertices portions have different shapes and sizes; the plurality of scanning electrode blocks comprises a plurality of scanning electrode blocks of an irregular shape in the one or more vertices portions of the three-dimensional body; and the plurality of scanning electrode blocks of the irregular shape in the one or more vertices portions and multiple scanning electrode blocks of the plurality of scanning electrode blocks outside the one or more vertices portions have different shapes and sizes.

BRIEF DESCRIPTION OF THE FIGURES

The following drawings are merely examples for illustrative purposes according to various disclosed embodiments and are not intended to limit the scope of the present invention.

FIG. 4 is a flow chart illustrating a method of fabricating a touch control panel in some embodiments according to the present disclosure.

FIG. 5 illustrates a process of molding a mother touch panel in some embodiments according to the present disclosure.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Multi-facet display apparatuses have been developed, which enables image display on multiple facets of the display apparatus in form of a continuous image. The multi-facet display apparatuses have a number of non-flat surfaces. For example, some multi-facet display apparatuses include a number of vertices and a number of curved edge portions. Touch control on multi-facet display apparatuses presents a difficult issue.

Accordingly, the present disclosure provides, inter alia, a touch control panel, a touch control panel apparatus, and a fabricating method thereof that substantially obviate one or more of the problems due to limitations and disadvantages of the related art. In one aspect, the present disclosure provides a touch control panel having a three-dimensional body having one or more vertices portions. In some embodiments, the touch control panel includes a touch electrode layer extending into the one or more vertices portions for detecting a touch. Optionally, the touch electrode layer includes a plurality of touch electrodes, each of which including a plurality of electrode blocks electrically connected together. Optionally, the plurality of electrode blocks includes a plurality of electrode blocks of an irregular shape in the one or more vertices portions of the three-dimensional body. Optionally, the plurality of electrode blocks of the irregular shape in the one or more vertices portions and multiple electrode blocks of the plurality of electrode blocks outside the one or more vertices portions have different shapes and sizes. Optionally, the touch control panel is a flexible touch control panel, and the touch control panel apparatus is a flexible touch control panel apparatus.

Figure 1:
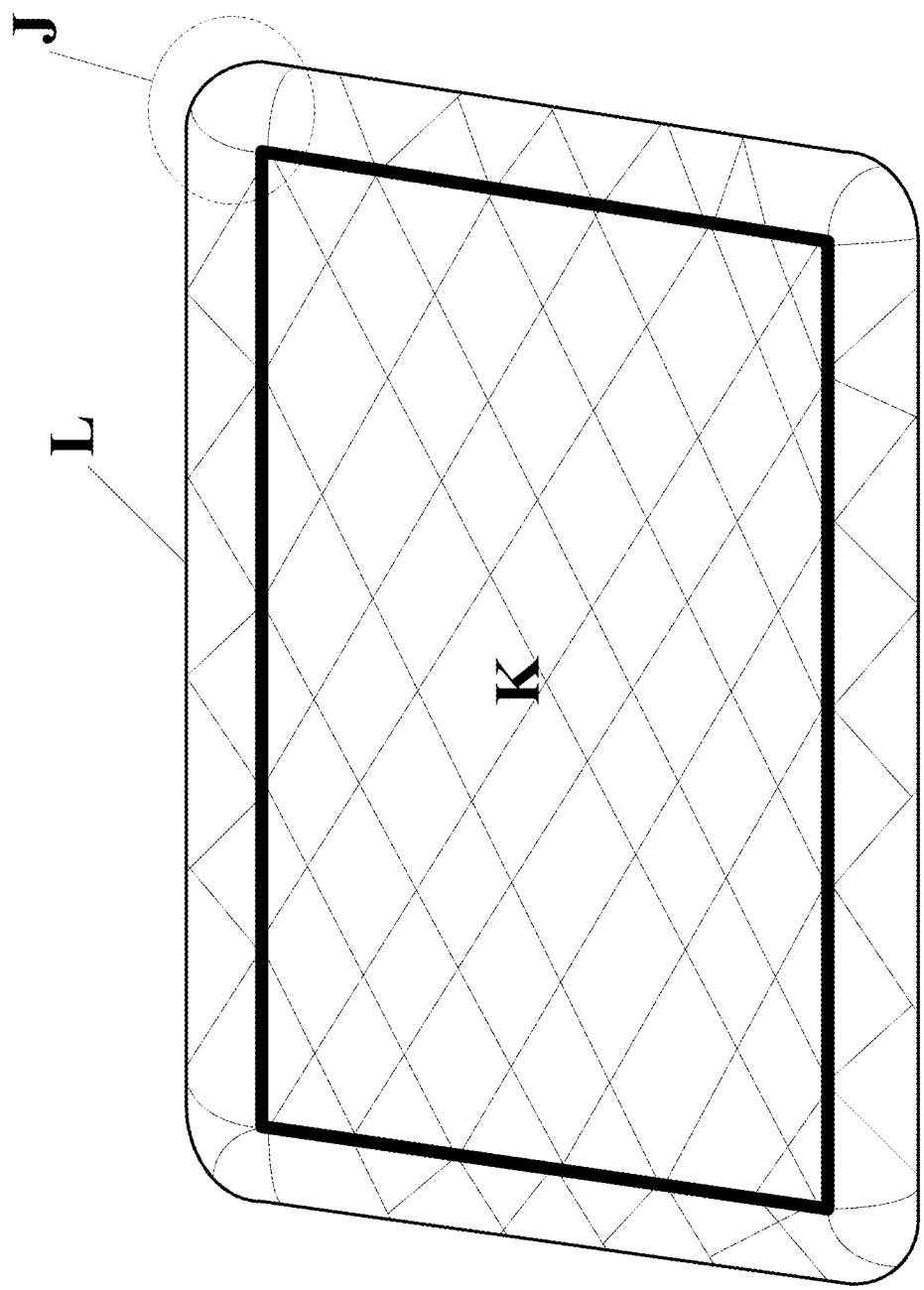
FIG. 1 is a schematic diagram illustrating the structure of a touch control panel in some embodiments according to the present disclosure.

FIG. 1 is a schematic diagram illustrating the structure of a touch control panel in some embodiments according to the present disclosure. Referring to FIG. 1, the touch control panel has a three-dimensional body having one or more vertices portions J (e.g., four vertices portions), and one or more curved edge portions L (e.g., four curved edge portions). In the present touch control panel, the touch electrode layer of the touch control panel extends into the one or more vertices portions J and the one or more curved edge portions L, enabling true touch detection and touch control in these portions of the touch control panel. The touch electrode layer in the present touch control panel includes a plurality of touch electrode blocks (e.g., sensing touch electrodes and scanning touch electrodes) in the one or more vertices portions J and the one or more curved edge portions L, highly sensitive touch detection can be realized in these portions, achieving stable touch control.

The touch control panel can be made to have various appropriate shapes. Accordingly, the three-dimensional body can have various appropriate shapes. In one example, the three-dimensional body has two curved edges portions. In another example, the three-dimensional body has four curved edges portions.

Figure 2:
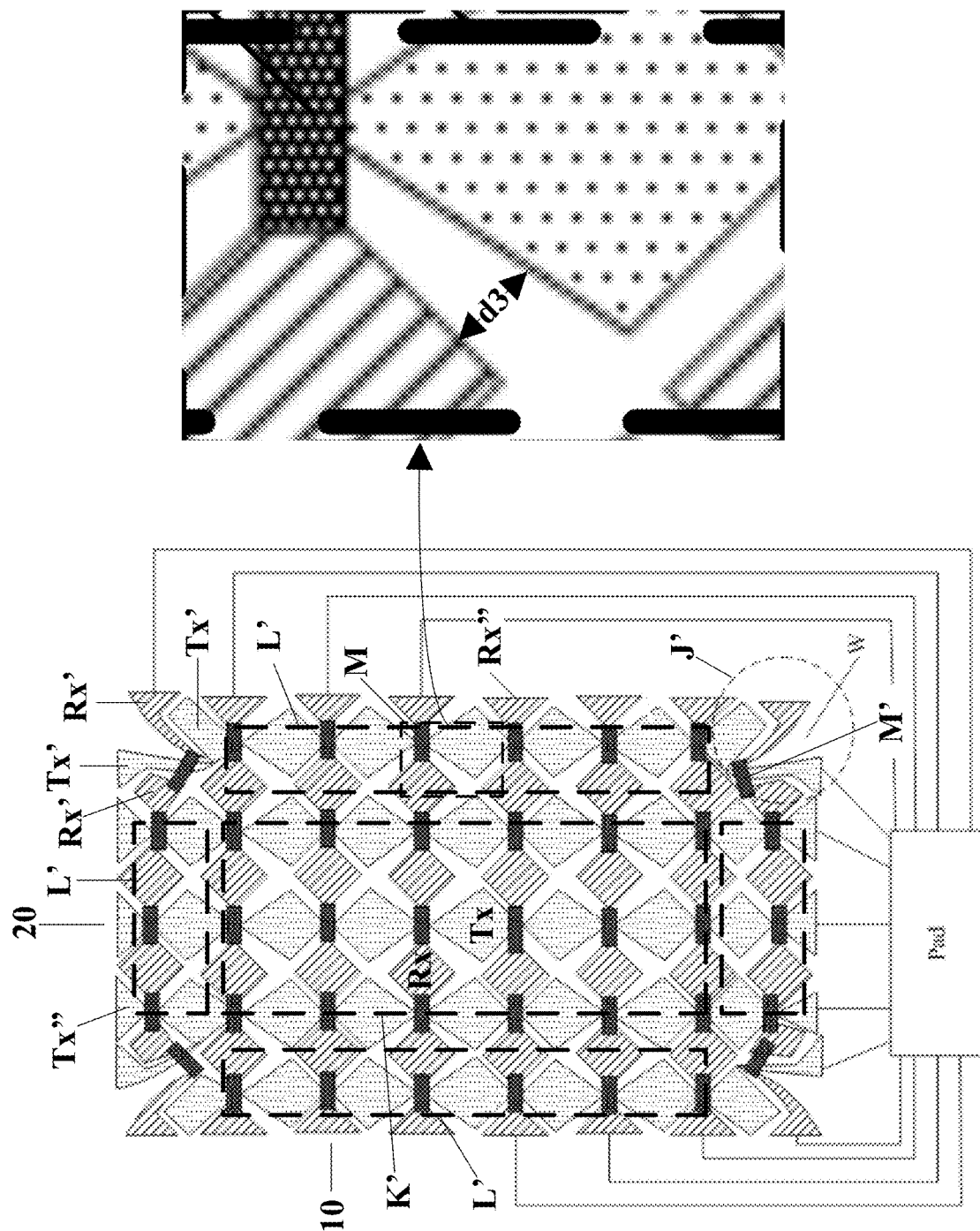
FIG. 2 is a schematic diagram illustrating the structure of a touch electrode layer in some embodiments according to the present disclosure.

FIG. 2 is a schematic diagram illustrating the structure of a touch electrode layer in some embodiments according to the present disclosure. Referring to FIG. 2, the touch electrode layer as shown is spread on a substantially flat surface, and is not yet folded into a three-dimensional body. Four corner regions J' (one of which is encircled by dotted lines in FIG. 2) of the touch electrode layer on the substantially flat surface is to be folded into four vertices portions J of the three-dimensional body. Thus, the touch electrode layer in FIG. 2 extends into four vertices portions J when the three-dimensional body when the touch electrode layer is folded into the three-dimensional body.

In some embodiments, the touch electrode layer includes a plurality of touch electrodes, each of which including a plurality of electrode blocks electrically connected together. In some embodiments, the touch electrode layer is a mutual capacitive touch electrode layer. As shown in FIG. 2, the touch electrode layer includes a plurality of touch sensing electrodes 10. Each of the plurality of touch sensing electrodes 10 includes a plurality of sensing electrode blocks Rx electrically connected together. The touch electrode layer further includes a plurality of touch scanning electrodes 20. Each of the plurality of touch scanning electrodes 20 includes a plurality of scanning electrode blocks Tx electrically connected together.

In some embodiments, the plurality of electrode blocks includes a plurality of electrode blocks of an irregular shape in the one or more vertices portions J of the three-dimensional body. Referring to FIG. 2, the plurality of sensing electrode blocks Rx includes a plurality of sensing electrode blocks of an irregular shape Rx' in four corner regions J of the touch electrode layer, which become four vertices portions J of the three-dimensional body when the touch electrode layer is folded. The plurality of sensing electrode blocks of the irregular shape Rx' in the one or more vertices portions J and multiple sensing electrode blocks of the plurality of sensing electrode blocks Rx outside the one or more vertices portions J have different shapes and sizes. As used herein, the term "irregular shape" refers to shapes that are asymmetrical. Optionally, an irregular shape in the context of the present disclosure refers to a shape that has at least one edge that is not straight. Optionally, the multiple sensing electrode blocks of the plurality of sensing electrode blocks Rx outside the one or more vertices portions J all have a regular shape, e.g., a shape that is symmetrical. Optionally, at least one of the multiple sensing electrode blocks of the plurality of sensing electrode blocks Rx outside the one or more vertices portions J also has an irregular shape, e.g., a shape that is asymmetrical.

Optionally, the plurality of sensing electrode blocks Rx in each of the plurality of touch sensing electrode 10 are electrically connected together through a plurality of bridges M. Various appropriate conductive materials and various appropriate fabricating methods may be used to make the plurality of touch sensing electrodes 10. For example, a conductive material may be deposited on the substrate, e.g., by sputtering or vapor deposition or solution coating; and patterned. Examples of appropriate conductive materials for making the plurality of touch sensing electrodes 10 include, but are not limited to, transparent conductive materials such as nano-silver and indium tin oxide, as well as various metallic conductive materials such as copper, silver, aluminum, molybdenum, alloys such as aluminum Neodymium (AlNd) and molybdenum Niobium (MoNb), and laminates thereof.

Referring to FIG. 2, the plurality of scanning electrode blocks Tx includes a plurality of scanning electrode blocks of an irregular shape Tx' in four corner regions J of the touch electrode layer, which become four vertices portions J of the three-dimensional body when the touch electrode layer is folded. The plurality of scanning electrode blocks of the irregular shape Tx' in the one or more vertices portions J and multiple scanning electrode blocks of the plurality of sensing electrode blocks Tx outside the one or more vertices portions J have different shapes and sizes. Optionally, the multiple scanning electrode blocks of the plurality of scanning electrode blocks Tx outside the one or more vertices portions J all have a regular shape, e.g., a shape that is symmetrical. Optionally, at least one of the multiple scanning electrode blocks of the plurality of scanning electrode blocks Tx outside the one or more vertices portions J also has an irregular shape, e.g., a shape that is asymmetrical.

Optionally, the plurality of scanning electrode blocks Tx in each of the plurality of touch scanning electrode 20 are directly electrically connected, e.g., without a bridge. Various appropriate conductive materials and various appropriate fabricating methods may be used to make the plurality of touch scanning electrodes 20. For example, a conductive material may be deposited on the substrate, e.g., by sputtering or vapor deposition or solution coating; and patterned. Examples of appropriate conductive materials for making the plurality of touch scanning electrodes 20 include, but are not limited to, transparent conductive materials such as nano-silver and indium tin oxide, as well as various metallic conductive materials such as copper, silver, aluminum, molybdenum, alloys such as aluminum Neodymium (AlNd) and molybdenum Niobium (MoNb), and laminates thereof.

Figure 3A:
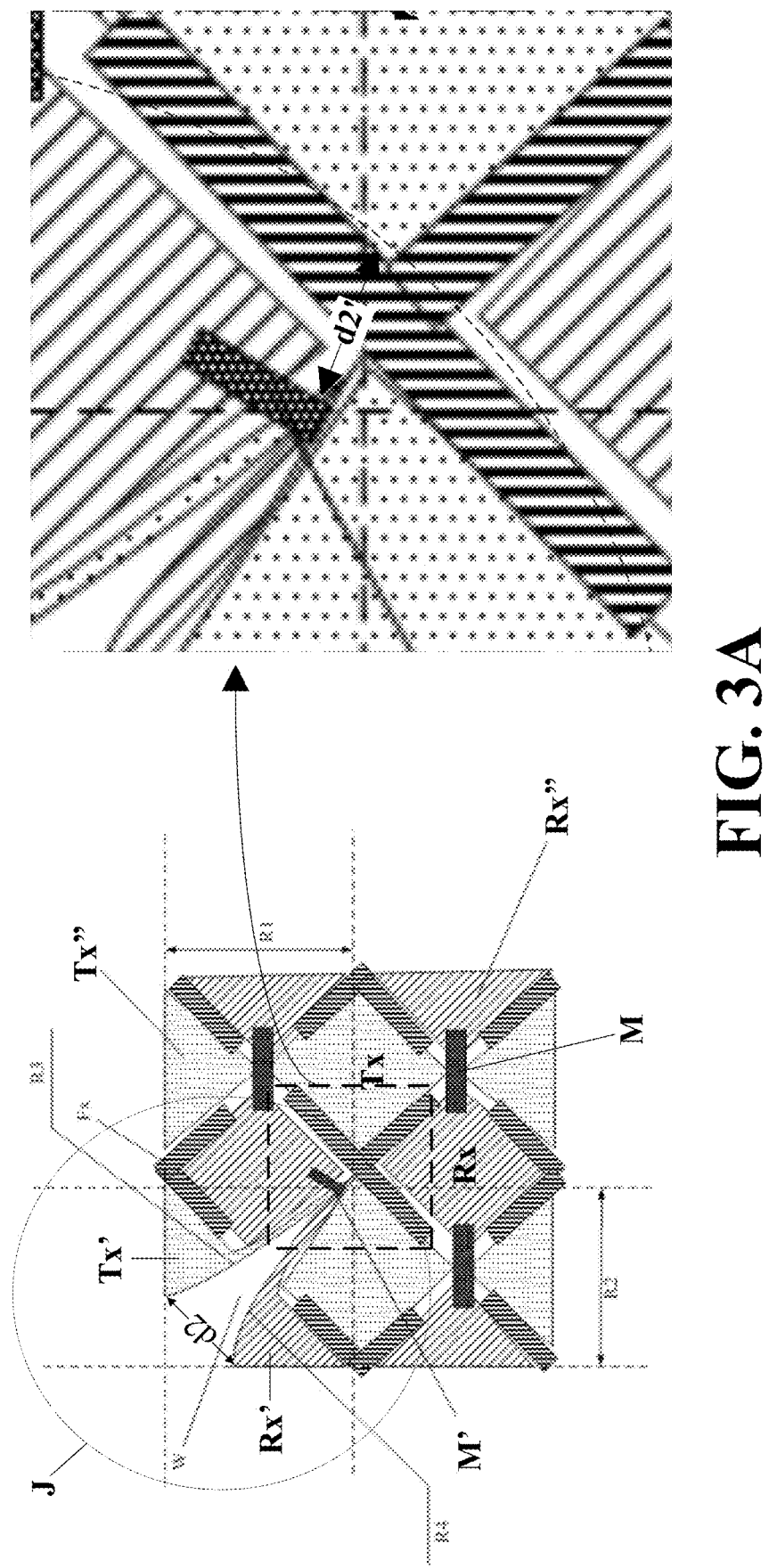
FIG. 3A is a zoom-in view of a touch electrode layer in some embodiments according to the present disclosure.

FIG. 3A is a zoom-in view of a touch electrode layer in some embodiments according to the present disclosure. Referring to FIG. 3A, the touch electrode layer in some embodiments further includes a plurality of dummy patterns Fx, which are electrically insulated from the touch electrode layer, e.g., electrically insulated from the plurality of sensing electrode blocks Rx and the plurality of scanning electrode blocks Tx.

Figure 3B:
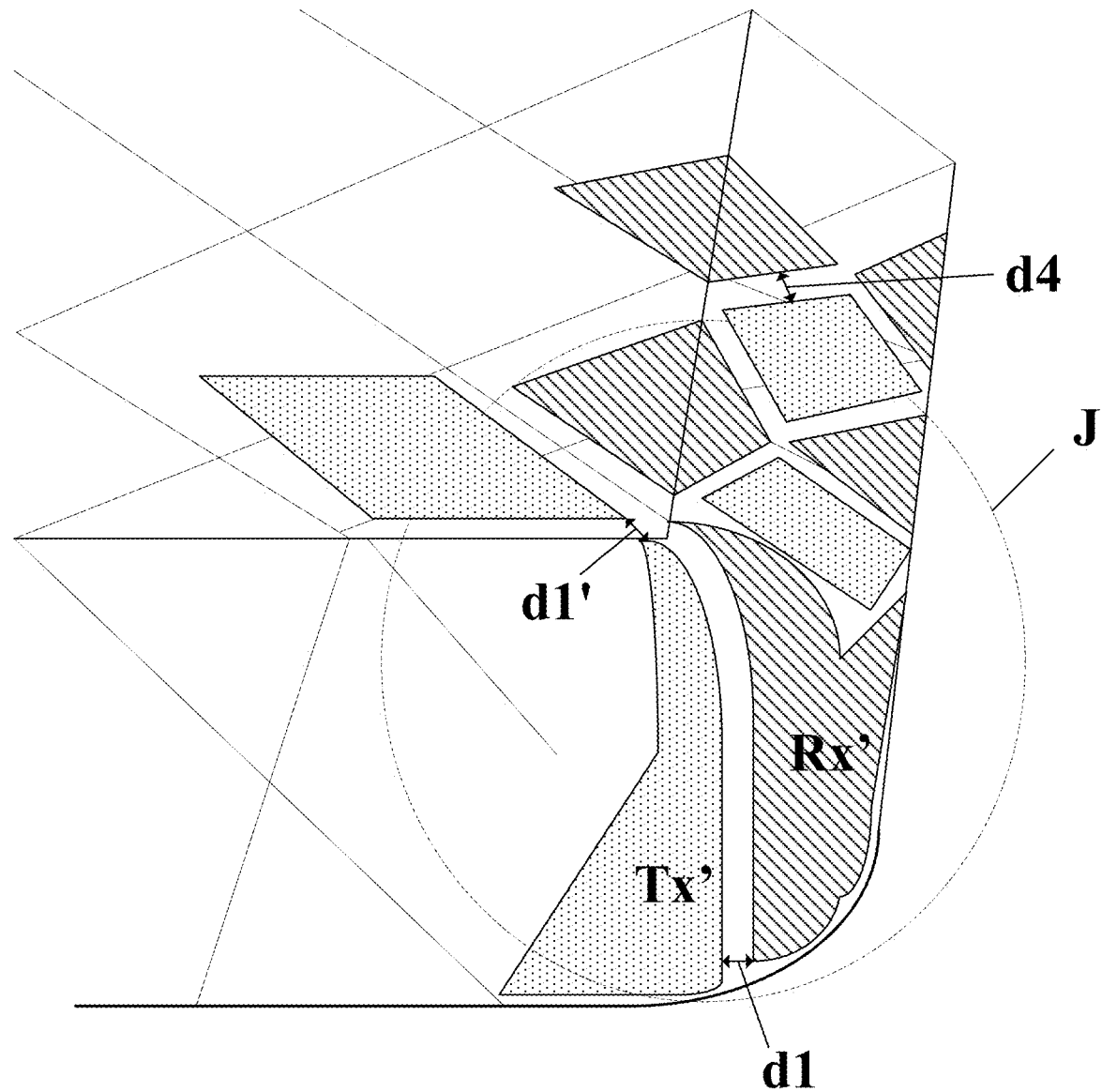
FIG. 3B is a zoom-in view of a touch electrode layer in some embodiments according to the present disclosure.

FIG. 3B is a zoom-in view of a touch electrode layer in some embodiments according to the present disclosure. Referring to FIG. 3B, the touch electrode layer is in a folded state in which the touch control panel is folded into a three-dimensional body having one or more vertices portions J. As shown in FIG. 3B, each of the plurality of electrode blocks of an irregular shape (e.g., one of the plurality of sensing electrode blocks of the irregular shape Rx' and one of the plurality of scanning electrode blocks of the irregular shape Tx') in one of the one or more vertices portions J is spaced apart from adjacent electrode blocks of the plurality of electrode blocks by a first distance d1 (e.g., an average spacing distance). Referring to FIG. 3A, each of the plurality of electrode blocks of an irregular shape (e.g., one of the plurality of sensing electrode blocks of the irregular shape Rx' and one of the plurality of scanning electrode blocks of the irregular shape Tx') in one of the corner regions J' (which corresponding to one of the vertices portions J when the touch control panel is folded) is spaced apart from adjacent electrode blocks of the plurality of electrode blocks by a second distance d2 (e.g., an average spacing distance), when the touch electrode layer spread on a substantially flat surface (e.g., in an unfolded state). The second distance d2 is greater than the first distance d1.

Optionally, when the touch control panel is folded into a three-dimensional body, each of the plurality of electrode blocks of an irregular shape (e.g., one of the plurality of sensing electrode blocks of the irregular shape Rx' and one of the plurality of scanning electrode blocks of the irregular shape Tx') in one of the one or more vertices portions J is spaced apart from an adjacent electrode block of the plurality of electrode blocks of the irregular shape by the first distance d1 (e.g., an average spacing distance), and is spaced apart from an adjacent electrode block which is not one of the plurality of electrode blocks of the irregular shape by a distance d1' (as depicted in FIG. 3B). When the touch electrode layer spread on a substantially flat surface (e.g., in an unfolded state), each of the plurality of electrode blocks of the irregular shape (e.g., one of the plurality of sensing electrode blocks of the irregular shape Rx' and one of the plurality of scanning electrode blocks of the irregular shape Tx') in one of the corner regions J' (which corresponding to one of the vertices portions J when the touch control panel is folded) is spaced apart from the adjacent electrode block of the plurality of electrode blocks of the irregular shape by the second distance d2 (e.g., an average spacing distance), and is spaced apart from the adjacent electrode block which is not one of the plurality of electrode blocks of the irregular shape by a distance d2' as depicted in FIG. 3A). The second distance d2 is greater than the first distance d1, and the distance d2' is substantially the same as the distance d1'.

Optionally, two adjacent electrode blocks of the irregular shape in one of the one or more vertices portions J are spaced apart from each other by the first distance d1 (e.g., an average spacing distance) when the touch control panel is folded into a three-dimensional body, and the two adjacent electrode blocks of the irregular shape in one of the corner regions J' (which corresponding to one of the vertices portions J when the touch control panel is folded) is spaced apart from each other by the second distance d2 (e.g., an average spacing distance), when the touch electrode layer spread on a substantially flat surface (e.g., in an unfolded state), and the second distance d2 is greater than the first distance d1. Optionally, the two adjacent electrode blocks of the irregular shape in one of the one or more vertices portions J are two electrode blocks respectively on two opposite sides of a diagonal line of the one or more vertices portions J. Optionally, the two adjacent electrode blocks of the irregular shape on the two opposite sides of the diagonal line includes one of the plurality of sensing electrode blocks of the irregular shape Rx' and one of the plurality of scanning electrode blocks of the irregular shape Tx'. Optionally, the two adjacent electrode blocks of the irregular shape on the two opposite sides of the diagonal line have a substantially the same area.

Referring to FIG. 1, in some embodiments, the three-dimensional body has a substantially flat portion K (corresponding to a region K' when the touch control panel is in an unfolded state as shown in FIG. 2). The plurality of electrode blocks of the irregular shape (e.g., the plurality of sensing electrode blocks of the irregular shape Rx' and the plurality of scanning electrode blocks of the irregular shape Tx') in the one or more vertices portions J and multiple electrode blocks of the plurality of electrode blocks in the substantially flat portion K have different shapes and sizes. Referring to FIG. 2 and FIG. 3A, when the touch control panel is in an unfolded state (e.g., when the touch electrode layer is spread on a substantially flat surface), the plurality of electrode blocks of the irregular shape (e.g., the plurality of sensing electrode blocks of the irregular shape Rx' and the plurality of scanning electrode blocks of the irregular shape Tx') in the corner regions J' and multiple electrode blocks of the plurality of electrode blocks in the region K' have different shapes and sizes.

Figure 3C:
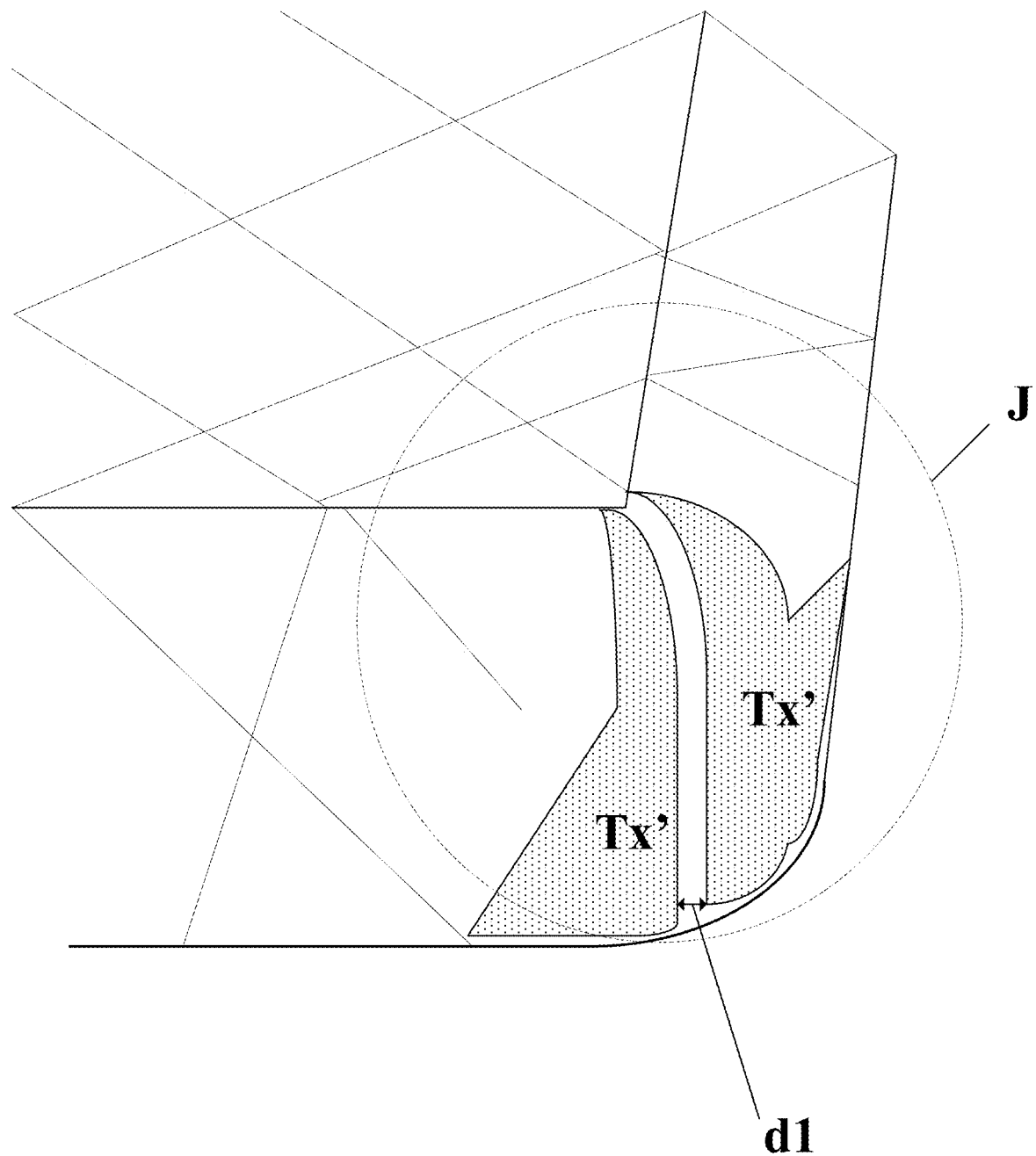
FIG. 3C is a zoom-in view of a touch electrode layer in some embodiments according to the present disclosure.

FIG. 3C is a zoom-in view of a touch electrode layer in some embodiments according to the present disclosure. Referring to FIG. 3C, the touch electrode layer includes two of the plurality of scanning electrode blocks of the irregular shape Tx' in the one or more vertices portions J. Optionally, two of the plurality of scanning electrode blocks of the irregular shape Tx' in the one or more vertices portions J in the three-dimensional body are spaced apart from each other a first distance d1. Optionally, two of the plurality of scanning electrode blocks of the irregular shape Tx' in the one or more corner regions J' (which corresponding to one of the vertices portions J when the touch control panel is folded) are spaced apart from each other by a second distance d2 (e.g., an average spacing distance), when the touch electrode layer spread on a substantially flat surface (e.g., in an unfolded state). The second distance d2 is greater than the first distance d1. Optionally, the two adjacent electrode blocks of the irregular shape in one of the one or more vertices portions J are two electrode blocks respectively on two opposite sides of a diagonal line of the one or more vertices portions J. Optionally, the two adjacent electrode blocks of the irregular shape on the two opposite sides of the diagonal line are two of the plurality of scanning electrode blocks of the irregular shape Tx'. Optionally, the two adjacent electrode blocks of the irregular shape on the two opposite sides of the diagonal line have a substantially the same area.

Figure 3D:
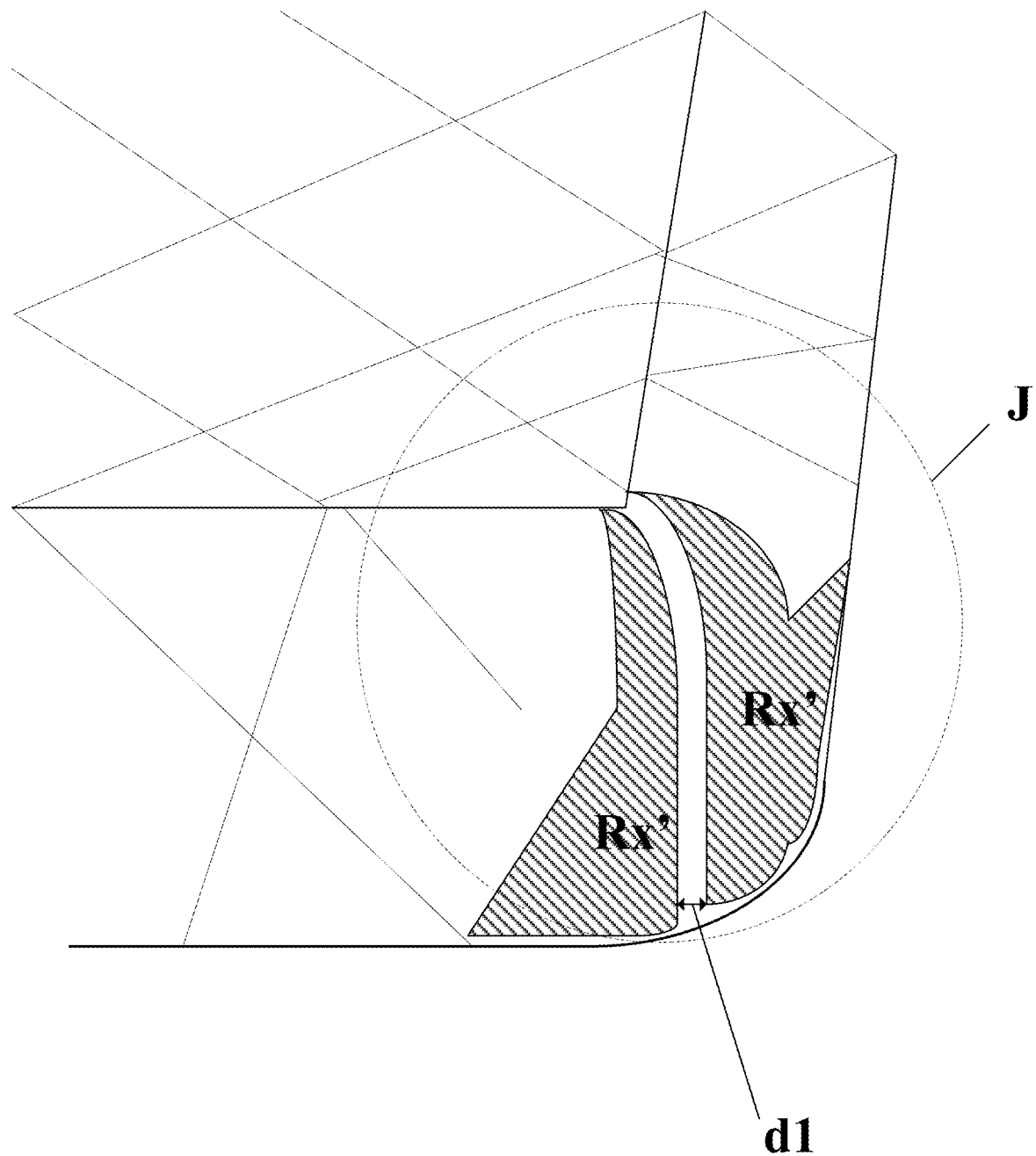
FIG. 3D is a zoom-in view of a touch electrode layer in some embodiments according to the present disclosure.

FIG. 3D is a zoom-in view of a touch electrode layer in some embodiments according to the present disclosure. Referring to FIG. 3D, the touch electrode layer includes two of the plurality of sensing electrode blocks of the irregular shape Rx' in the one or more vertices portions J. Optionally, two of the plurality of sensing electrode blocks of the irregular shape Rx' in the one or more vertices portions J in the three-dimensional body are spaced apart from each other a first distance d1. Optionally, two of the plurality of sensing electrode blocks of the irregular shape Rx' in the one or more corner regions J' (which corresponding to one of the vertices portions J when the touch control panel is folded) are spaced apart from each other by a second distance d2 (e.g., an average spacing distance), when the touch electrode layer spread on a substantially flat surface (e.g., in an unfolded state). The second distance d2 is greater than the first distance d1. Optionally, the two adjacent electrode blocks of the irregular shape in one of the one or more vertices portions J are two electrode blocks respectively on two opposite sides of a diagonal line of the one or more vertices portions J. Optionally, the two adjacent electrode blocks of the irregular shape on the two opposite sides of the diagonal line are two of the plurality of sensing electrode blocks of the irregular shape Rx'. Optionally, the two adjacent electrode blocks of the irregular shape on the two opposite sides of the diagonal line have a substantially the same area.

Referring to FIG. 1, in some embodiments, the three-dimensional body has one or more curved edge portions L connecting to the one or more vertices portions J. The one or more curved edge portions L correspond one or more regions L' when the touch control panel is in an unfolded state as shown in FIG. 2. The plurality of electrode blocks of the irregular shape (e.g., the plurality of sensing electrode blocks of the irregular shape Rx' and the plurality of scanning electrode blocks of the irregular shape Tx') in the one or more vertices portions J and multiple electrode blocks of the plurality of electrode blocks in the one or more curved edge portions L have different shapes and sizes. Referring to FIG. 2, when the touch control panel is in an unfolded state (e.g., when the touch electrode layer spread on a substantially flat surface), the plurality of electrode blocks of the irregular shape (e.g., the plurality of sensing electrode blocks of the irregular shape Rx' and the plurality of scanning electrode blocks of the irregular shape Tx') in the corner regions J' and multiple electrode blocks of the plurality of electrode blocks in the one or more regions L' have different shapes and sizes.

In some embodiments, and referring to FIG. 1, the one or more vertices portions J are one or more radiused vertices portions without a sharp edge or vertices. In some embodiments, the three-dimensional body is a cuboid body having four radiused vertices portions and four curved edge portions connecting the four radiused vertices portions. Optionally, the touch electrode layer is a continuous touch electrode layer extending throughout one or more face portions (e.g., the substantially flat portion K) of the cuboid body, the four radiused vertices portions, and the four curved edge portions.

In some embodiments, each of the plurality of electrode blocks of the irregular shape has a shape different from a shape of electrode blocks located within a repeating pattern of the plurality of touch electrodes. Referring to FIG. 1, FIG. 2, and FIG. 3A, in some embodiments, each of the plurality of sensing electrode blocks of the irregular shape Rx' has a shape different from a shape of electrode blocks located within a repeating pattern of the plurality of touch sensing electrodes 10; and each of the plurality of scanning electrode blocks of the irregular shape Tx' has a shape different from a shape of electrode blocks located within a repeating pattern of the plurality of touch scanning electrodes 20. As shown in FIG. 2, the shape of electrode blocks of repeating pattern in the same one of the plurality of touch sensing electrodes 10 is a square shape, and the plurality of sensing electrode blocks of the irregular shape Rx' in the same one of the plurality of touch sensing electrodes 10 has an irregular, non-square, shape. The shape of electrode blocks located within a repeating pattern of the plurality of touch scanning electrodes 20 is a diamond shape, and the plurality of scanning electrode blocks of the irregular shape Tx' in the same one of the plurality of touch scanning electrodes 20 has an irregular, non-diamond, shape.

Optionally, the touch control panel is a flexible touch control panel, and the touch electrode layer is a flexible touch electrode layer. Various appropriate conductive materials and various appropriate fabricating methods may be used for making the touch electrode layer in the present touch control panel. Examples of appropriate conductive materials for making the touch electrode layer include various metals and alloys, metal mesh, carbon nano-tubes, and graphene materials.

In some embodiments, the touch electrode layer further includes one or more electrode blocks of the irregular shape in the one or more curved edge portions L when the touch electrode layer is in a folded state (or in the one or more regions L' when the touch electrode layer is in an unfolded state). Optionally, each of the one or more electrode blocks of the irregular shape in the one or more curved edge portions L when the touch electrode layer is in a folded state is spaced apart from adjacent electrode blocks of the plurality of electrode blocks by a third distance d3 (e.g., an average spacing distance; as depicted in FIG. 2). Optionally, each of the one or more electrode blocks of the irregular shape in the one or more regions L' (which corresponding to the one or more curved edge portions L when the touch electrode layer is in a folded state) is spaced apart from adjacent electrode blocks of the plurality of electrode blocks by a fourth distance d4 (e.g., an average spacing distance; as depicted in FIG. 3B), when the touch electrode layer spread on a substantially flat surface (e.g., in an unfolded state). The fourth distance d4 is substantially the same as the third distance d3.

Referring to FIG. 2 and FIG. 3, the touch electrode layer in each of the one or more vertices portions J when the touch electrode layer is in a folded state (or in each of the corner regions J' when the touch electrode layer is in an unfolded state) has four electrode blocks of the irregular shape. Depending on specific designs of the touch control panel, the touch electrode layer may have any appropriate number (e.g., 2, 4, 6, 10 or more) of electrode blocks of the irregular shape. In one example, the touch control panel is a relatively low-resolution touch control panel, each of the plurality of touch electrode blocks has a relatively larger area, and the touch electrode layer has fewer numbers of electrode blocks of the irregular shape (e.g., two). In another example, the touch control panel is a relatively high-resolution touch control panel, each of the plurality of touch electrode blocks has a relatively smaller area, and the touch electrode layer has higher numbers of electrode blocks of the irregular shape (e.g., six or more).

In another aspect, the present disclosure provides a method of fabricating a touch control panel having a three-dimensional body having one or more vertices portions. In some embodiments, the method includes forming a touch electrode layer extending into the one or more vertices portions for detecting a touch. Optionally, the step of forming the touch electrode layer includes forming a plurality of touch electrodes, each of which formed to include a plurality of electrode blocks electrically connected together. Optionally, the step of forming the plurality of electrode blocks includes forming a plurality of electrode blocks of an irregular shape in the one or more vertices portions of the three-dimensional body. Optionally, the plurality of electrode blocks of the irregular shape in the one or more vertices portions and multiple electrode blocks of the plurality of electrode blocks outside the one or more vertices portions are formed to have different shapes and sizes. Optionally, each of the plurality of electrode blocks of the irregular shape is formed to have a shape different from a shape of electrode blocks located within a repeating pattern of the plurality of touch electrodes.

FIG. 4 is a flow chart illustrating a method of fabricating a touch control panel in some embodiments according to the present disclosure. Referring to FIG. 4, the method in some embodiments includes forming a mother touch panel on a substantially flat base substrate; removing a portion of the mother touch panel in one or more corners of the mother touch panel thereby forming the plurality of electrode blocks of the irregular shape and allowing the mother touch panel to be folded into the three-dimensional body; and subsequent to removing the portion of the mother touch panel, folding the mother touch panel into the three-dimensional body having the one or more vertices portions. The step of removing the portion of the mother touch panel creates folding allowance for allowing the mother touch panel to be folded into the three-dimensional body.

In the present method, the mother touch panel is first formed on a substantially flat base substrate. The mother touch panel on the substantially flat base substrate is then cut to form a desired pattern. The degrees of open angle of the cut portion depend on a curvature of the one or more vertices of the three-dimensional body to be formed. The greater the curvature, the greater the degrees of open angle. For example, the greater a change of curvature along a direction from the upper surface to the lower surface of the three-dimensional body, the greater the bending degree of the cutting edge. By cutting a portion in one or more corners of the mother touch panel, a folding allowance is created, allowing subsequently the mother touch panel to be folded into the three-dimensional body. Referring to FIG. 2 and FIG. 3, the folding allowance W is approximately the empty region formed by removing the portion of the mother touch panel in one or more corners. By having a folding allowance W, the corrugation during the three-dimensional folding can be avoided. The degree of folding allowance can be increased or decreased based on the dimension of the vertices.

FIG. 5 illustrates a process of molding a mother touch panel in some embodiments according to the present disclosure. Referring to FIG. 5, the mother touch panel is folded into the three-dimensional body by a molding process. The mother touch panel P is placed between an upper mold and a lower mold of a compression molding. The mother touch panel P is molded into a three-dimensional body by the compression molding.

Optionally, the step of folding the mother touch panel into the three-dimensional body is performed by three-dimensional encapsulation.

Referring to FIG. 2, by first cutting the mother touch panel to form one or more regions J' corresponding to one or more vertices J in the three-dimensional body and one or more region L' corresponding to one or more curved edge portions L in the final touch control panel, true touch detection and touch control in these portions of the final touch control panel can be achieved. The touch electrode layer fabricated by the present method includes a plurality of touch electrode blocks (e.g., sensing touch electrodes and scanning touch electrodes) in the one or more vertices portions J and the one or more curved edge portions L, highly sensitive touch detection can be realized in these portions, achieving stable touch control.

In some embodiments, the step of removing the portion of the mother touch panel includes removing a portion of the mother touch panel in each of four corners of the mother touch panel (as shown in FIG. 2), thereby forming folding allowance W for each of the four vertices of the three-dimensional body. Subsequently, the mother touch panel is folded into the three-dimensional body having the four vertices portions and four curved edge portions connecting the four radiused vertices portions. The touch electrode layer is formed as a continuous touch electrode layer extending throughout one or more face portions of the cuboid body, the four radiused vertices portions, and the four curved edge portions. Optionally, the folding allowance W created for each of the four vertices is substantially the same. Optionally, two cutting edges adjacent to each folding allowance W are axis-symmetrical. Referring to FIG. 3, in some embodiments, the folding regions on two sides of the folding allowance W have substantially the same area. The bending radii for the two folding regions are R1 and R2, respectively. The radii of curvature of the two cutting edges on two sides of the folding allowance are R3 and R4, respectively. Optionally, R1 and R2 are substantially the same, and R3 and R4 are substantially the same. In one example, R1 and R2 are approximately 4 mm, and R3 and R4 are approximately 15.3 mm.

In some embodiments, subsequent to removing the portion of the mother touch panel and prior to folding the mother touch panel, the method further includes forming one or more connection bridges connecting one of the plurality of electrode blocks of the irregular shape with an adjacent electrode block so that the plurality of electrode blocks in each individual one of the plurality of touch electrodes are electrically connected. Referring to FIG. 2 and FIG. 3, subsequent to removing a portion of the mother touch panel in each of four corners of the mother touch panel to create the folding allowance W, the plurality of electrode blocks of an irregular shape (e.g., the plurality of sensing electrode blocks of the irregular shape Rx' and the plurality of scanning electrode blocks of the irregular shape Tx') are created. The plurality of electrode blocks of an irregular shape may be disconnected from the adjacent electrode block of the plurality of electrode blocks in a same one of the plurality of touch electrodes. By forming the connection bridge, each of the plurality of electrode blocks of an irregular shape can be electrically connected to the adjacent electrode block of the plurality of electrode blocks in a same one of the plurality of touch electrodes. In one example, at least one of the plurality of sensing electrode blocks of the irregular shape Rx' is disconnected from the adjacent sensing electrode block of the plurality of sensing electrode blocks Rx in a same one of the plurality of touch sensing electrodes 10. As shown in FIG. 2 and FIG. 3, a connection bridge M' is formed to electrically connect the at least one of the plurality of sensing electrode blocks of the irregular shape Rx' with the adjacent sensing electrode block of the plurality of sensing electrode blocks Rx in a same one of the plurality of touch electrodes 10.

In some embodiments, prior to removing the portion of the mother touch panel and prior to folding the mother touch panel, the method further includes forming one or more connection bridges connecting one of the plurality of electrode blocks (a portion of which is to be removed to form one of the plurality of electrode blocks of the irregular shape in a subsequent removing step) with an adjacent electrode block so that the plurality of electrode blocks in each individual one of the plurality of touch electrodes are electrically connected subsequent to the removing step.

Optionally, the method further includes, subsequent to the removing step, repairing the above-described one or more connection bridges damaged or partially damaged during the removing step, e.g., by laser soldering.

Optionally, the connection bridge M' is formed in a region so that the formation of the connection bridge M' does not interfere the folding of the mother touch panel, and that the folding of the mother touch panel would not deform the connection bridge M'. In some examples, the connection bridge M' is formed in a region very close to the vertex angle of the folding allowance W. Optionally, the connection bridge M' is formed to cross the vertex angle of the folding allowance W.

Optionally, the method further includes forming a plurality of touch signal lines respectively connected to the plurality of touch electrodes (e.g., the plurality of touch sensing electrodes 10 and the plurality of touch scanning electrode 20). Referring to FIG. 2, the plurality of touch signal lines connecting the plurality of touch electrodes to a bonding pad Pad.

In some embodiments, the three-dimensional body has one or more curved edge portions connecting to the one or more vertices portions. Optionally, the plurality of electrode blocks of the irregular shape in the one or more vertices portions and multiple electrode blocks of the plurality of electrode blocks in the one or more curved edge portions have different shapes and sizes. Optionally, the three-dimensional body is a cuboid body having four radiused vertices portions and four curved edge portions connecting the four radiused vertices portions. Optionally, the touch electrode layer is formed as a continuous touch electrode layer extending throughout one or more face portions of the cuboid body, the four radiused vertices portions, and the four curved edge portions.

In some embodiments, the touch control panel is a mutual capacitive touch control panel. Optionally, the step of forming the touch electrode layer includes forming a plurality of touch sensing electrodes and a plurality of touch scanning electrodes. Optionally, each of the plurality of touch sensing electrodes is formed to include a plurality of sending electrode blocks electrically connected together; each of the plurality of touch scanning electrodes is formed to include a plurality of scanning electrode blocks electrically connected together; the plurality of sensing electrode blocks are formed to include a plurality of sensing electrode blocks of an irregular shape in the one or more vertices portions of the three-dimensional body; the plurality of sensing electrode blocks of the irregular shape in the one or more vertices portions and multiple sensing electrode blocks of the plurality of sensing electrode blocks outside the one or more vertices portions have different shapes and sizes; the plurality of scanning electrode blocks comprises a plurality of scanning electrode blocks of an irregular shape in the one or more vertices portions of the three-dimensional body; and the plurality of scanning electrode blocks of the irregular shape in the one or more vertices portions and multiple scanning electrode blocks of the plurality of scanning electrode blocks outside the one or more vertices portions have different shapes and sizes.

Optionally, each of the plurality of sensing electrode blocks of the irregular shape is formed to have a shape different from a shape of electrode blocks located within a repeating pattern of the plurality of touch sensing electrodes, and each of the plurality of scanning electrode blocks of the irregular shape is formed to have a shape different from a shape of electrode blocks located within a repeating pattern of the plurality of touch scanning electrodes.

In another aspect, the present disclosure provides a touch control display apparatus having the touch control display panel described herein or fabricated by a method described herein. Optionally, the touch control display apparatus is a liquid crystal display apparatus. Optionally, the touch control display apparatus is an organic light emitting diode display apparatus. Optionally, the touch control display apparatus is an electrophoretic display apparatus. Examples of appropriate display apparatuses include, but are not limited to, an electronic paper, a mobile phone, a tablet computer, a television, a monitor, a notebook computer, a digital album, a GPS, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch control panel having a three-dimensional body having one or more vertices portions, comprising a touch electrode layer extending into the one or more vertices portions for detecting a touch;
wherein the touch electrode layer comprises a plurality of touch electrodes, each of which comprising a plurality of electrode blocks electrically connected together;
the plurality of electrode blocks comprise a plurality of electrode blocks of an irregular shape in the one or more vertices portions of the three-dimensional body; and
a respective one of the plurality of electrode blocks of the irregular shape in the one or more vertices portions has a different shape and a different size from a respective one of multiple electrode blocks of the plurality of electrode blocks outside the one or more vertices portions;

wherein a first respective electrode block of the irregular shape and a second respective electrode block of the irregular shape are adjacent to each other in a respective vertices portion;
the first respective electrode block comprises a first elongated arm;
the second respective electrode block comprises a second elongated arm;
the first elongated arm and the second elongated arm respectively extend along two sides of an edge connected to a vertex point in the respective vertices portion, the edge connecting two side face portions of the three-dimensional body, the first elongated arm and the second elongated arm are respectively on the two side face portions; and
the touch control panel further comprises a connection bridge in a respective vertices portion connecting the second elongated arm of the second respective electrode block to an adjacent electrode block.

2. The touch control panel of claim 1, wherein the plurality of electrode blocks comprise touch sensing electrode blocks and touch scanning electrode blocks, and wherein each of the plurality of electrode blocks of the irregular shape has a shape different from a shape of electrode blocks located within a repeating pattern of a same type of the plurality of electrode blocks; and
the connection bridge extends along a direction different from an extension direction of connection bridges connecting adjacent electrode blocks located within the repeating pattern.

3. The touch control panel of claim 1, wherein at least one of the plurality of electrode blocks of the irregular shape in the three-dimensional body is spaced apart from adjacent electrode blocks of the plurality of electrode blocks by a first distance; and
the at least one of the plurality of electrode blocks of an irregular shape is spaced apart from adjacent electrode blocks of the plurality of electrode blocks by a distance greater than the first distance when the touch electrode layer is spread on a substantially flat surface.

4. The touch control panel of claim 1, wherein the three-dimensional body has substantially flat portion; and
a respective one of the plurality of electrode blocks of the irregular shape in the one or more vertices portions has a different shape and a different size from a respective one of multiple electrode blocks of the plurality of electrode blocks in the substantially flat portion.

5. The touch control panel of claim 1, wherein the three-dimensional body has one or more curved edge portions connecting to the one or more vertices portions; and
a respective one of the plurality of electrode blocks of the irregular shape in the one or more vertices portions has a different shape and a different size from a respective one of multiple electrode blocks of the plurality of electrode blocks in the one or more curved edge portions.

6. The touch control panel of claim 1, wherein the one or more vertices portions are one or more radiused vertices portions.

7. The touch control panel of claim 1, wherein the three-dimensional body is a cuboid body having four radiused vertices portions and four curved edge portions connecting the four radiused vertices portions; and
the touch electrode layer is a continuous touch electrode layer extending throughout one or more face portions of the cuboid body, the four radiused vertices portions, and the four curved edge portions.

8. The touch control panel of claim 1, wherein the touch control panel is a flexible touch control panel.

9. A touch control display apparatus, comprising the touch control panel of claim 1.

10. The touch control panel of claim 1, wherein the touch control panel is a mutual capacitive touch control panel, comprising a plurality of touch sensing electrodes and a plurality of touch scanning electrodes;
each of the plurality of touch sensing electrodes comprises a plurality of sensing electrode blocks electrically connected together;
each of the plurality of touch scanning electrodes comprises a plurality of scanning electrode blocks electrically connected together;
the plurality of sensing electrode blocks comprises a plurality of sensing electrode blocks of an irregular shape in the one or more vertices portions of the three-dimensional body;
a respective one of the plurality of sensing electrode blocks of the irregular shape in the one or more vertices portions has a different shape and a different size from a respective one of multiple sensing electrode blocks of the plurality of sensing electrode blocks outside the one or more vertices portions;
the plurality of scanning electrode blocks comprises a plurality of scanning electrode blocks of an irregular shape in the one or more vertices portions of the three-dimensional body; and
a respective one of the plurality of scanning electrode blocks of the irregular shape in the one or more vertices portions has a different shape and a different size from a respective one of multiple scanning electrode blocks of the plurality of scanning electrode blocks outside the one or more vertices portions.

11. The touch control panel of claim 10, wherein each of the plurality of sensing electrode blocks of the irregular shape has a shape different from a shape of electrode blocks located within a repeating pattern of a same type of the plurality of electrode blocks; and
each of the plurality of scanning electrode blocks of the irregular shape has a shape different from a shape of electrode blocks located within a repeating pattern of a same type of the plurality of electrode blocks.

12. A method of fabricating a touch control panel having a three-dimensional body having one or more vertices portions, comprising forming a touch electrode layer extending into the one or more vertices portions for detecting a touch;
wherein forming the touch electrode layer comprises forming a plurality of touch electrodes, each of which formed to comprise a plurality of electrode blocks electrically connected together;
wherein forming the plurality of electrode blocks comprises forming a plurality of electrode blocks of an irregular shape in the one or more vertices portions of the three-dimensional body; and
wherein a respective one of the plurality of electrode blocks of the irregular shape in the one or more vertices portions has a different shape and a different size from a respective one of multiple electrode blocks of the plurality of electrode blocks outside the one or more vertices portions;
wherein a first respective electrode block of the irregular shape and a second respective electrode block of the irregular shape are adjacent to each other in a respective vertices portion;

the first respective electrode block comprises a first elongated arm;

the second respective electrode block comprises a second elongated arm;

the first elongated arm and the second elongated arm respectively extend along two sides of an edge connected to a vertex point in the respective vertices portion, the edge connecting two side face portions of the three-dimensional body, the first elongated arm and the second elongated arm are respectively on the two side face portions; and the touch control panel further comprises a connection bridge in a respective vertices portion connecting the second elongated arm of the second respective electrode block to an adjacent electrode block.

13. The method of claim 12, wherein each of the plurality of electrode blocks of the irregular shape is formed to have a shape different from a shape of electrode blocks located within a repeating pattern of a same type of the plurality of electrode blocks; and the connection bridge is formed to extend along a direction different from an extension direction of connection bridges connecting adjacent electrode blocks located within the repeating pattern.

14. The method of claim 12, wherein the three-dimensional body has one or more curved edge portions connecting to the one or more vertices portions; and a respective one of the plurality of electrode blocks of the irregular shape in the one or more vertices portions has a different shape and a different size from a respective one of multiple electrode blocks of the plurality of electrode blocks in the one or more curved edge portions.

15. The method of claim 12, wherein the three-dimensional body is a cuboid body having four radiused vertices portions and four curved edge portions connecting the four radiused vertices portions;

wherein the touch electrode layer is formed as a continuous touch electrode layer extending throughout one or more face portions of the cuboid body, the four radiused vertices portions, and the four curved edge portions.

16. The method of claim 12, comprising:

forming a mother touch panel on a substantially flat base substrate;

removing a portion of the mother touch panel in one or more corners of the mother touch panel thereby forming the plurality of electrode blocks of the irregular shape and allowing the mother touch panel to be folded into the three-dimensional body; and subsequent to removing the portion of the mother touch panel, folding the mother touch panel into the three-dimensional body having the one or more vertices portions.

17. The method of claim 16, wherein folding the mother touch panel into the three-dimensional body is performed by molding.

18. The method of claim 16, wherein folding the mother touch panel into the three-dimensional body is performed by three-dimensional encapsulation.

19. The method of claim 16, subsequent to removing the portion of the mother touch panel and prior to folding the mother touch panel, further comprising forming one or more connection bridges connecting one of the plurality of electrode blocks of the irregular shape with an adjacent electrode block so that the plurality of electrode blocks in each individual one of the plurality of touch electrodes are electrically connected.

20. The method of claim 16, wherein removing the portion of the mother touch panel comprises removing a portion of the mother touch panel in each of four corners of the mother touch panel;

the mother touch panel is folded into the three-dimensional body having four vertices portions and four curved edge portions connecting the four vertices portions; and the touch electrode layer is formed as a continuous touch electrode layer extending throughout one or more face portions of the three-dimensional body, the four vertices portions, and the four curved edge portions.

* * * * *